United States Patent [19]

Bartfai et al.

[11] Patent Number: 6,012,150
[45] Date of Patent: *Jan. 4, 2000

[54] APPARATUS FOR SYNCHRONIZING OPERATOR INITIATED COMMANDS WITH A FAILOVER PROCESS IN A DISTRIBUTED PROCESSING SYSTEM

[75] Inventors: Robert F. Bartfai, West Shokan; John Divirgilio, Middletown; John W. Doxtader, Hurley; Peter J. LeVangia, Kingston; Laura J. Merritt, Wappingers Falls; Nicholas P. Rash, Poughkeepsie; Kevin J. Reilly, Kingston, all of N.Y.

[73] Assignee: International Business Machines Corporation, Armonk, N.Y.

[*] Notice: This patent is subject to a terminal disclaimer.

[21] Appl. No.: 08/827,133

[22] Filed: Mar. 27, 1997

[51] Int. Cl.[7] .............................. G06F 11/00; G06F 11/22
[52] U.S. Cl. ................................ 714/4; 714/12; 709/248; 709/400; 710/61
[58] Field of Search ......................... 395/182.02, 182.05, 395/182.09, 182.1, 182.11, 182.13, 182.21, 183.17, 200.78, 553, 561, 595, 670, 671, 672, 881; 371/5.4, 47.1; 340/825.14; 714/4, 7, 11, 12, 13; 709/248, 400; 710/61

[56] References Cited

U.S. PATENT DOCUMENTS

| | | | |
|---|---|---|---|
| 4,590,554 | 5/1986 | Glazer et al. | 395/182.11 |
| 5,136,498 | 8/1992 | McLaughlin et al. | 364/184 |
| 5,247,655 | 9/1993 | Khan et al. | 711/106 |
| 5,404,544 | 4/1995 | Crayford | 395/750 |
| 5,408,645 | 4/1995 | Ikeda et al. | 395/575 |
| 5,408,649 | 4/1995 | Berhears et al. | 395/182.08 |
| 5,426,774 | 6/1995 | Banerjee et al. | 714/16 |
| 5,463,763 | 10/1995 | Kubo | 714/4 |
| 5,473,599 | 12/1995 | Li et al. | 370/16 |
| 5,485,465 | 1/1996 | Liu et al. | 714/4 |
| 5,544,077 | 8/1996 | Hershey | 702/58 |
| 5,751,955 | 5/1998 | Sonnier et al. | 395/200.19 |
| 5,764,903 | 6/1998 | Yu | 395/200.38 |
| 5,875,290 | 2/1999 | Bartjai et al. | 714/13 |

FOREIGN PATENT DOCUMENTS 0609 051 A1 3/1994 European Pat. Off. ........ G06F 12/08

OTHER PUBLICATIONS

Groetsch, W. & Brand, T., Unix fault tolerance with the queue and count design; Conference pp. 233–243; Sep. 1989.

"Supervisor Recovery in Ring Networks", A. Goyal and R. Nelson, IBM Technical Disclosure Bulletin, vol. 27, No. 8, Jan. 1865, pp. 4715–4717.

*Primary Examiner*—Dieu-Minh T. Le
*Attorney, Agent, or Firm*—Floyd A. Gonzalez; David A. Fox; Cantor Colburn LLP

[57] ABSTRACT

An apparatus for synchronizing operator commands with a failover process in a distributed system having a control workstation and a plurality of nodes. One of the nodes of the distributed system is designated a primary node and one of the nodes is designated a backup node. The backup node includes a backup daemon for performing a failover process if the primary node fails such that the backup node becomes the primary node. Shell scripts send a command string to be synchronized with the operation of the backup daemon from the control workstation to the backup node. The backup daemon is then checked to determine if the backup daemon is sleeping, and, in the event the backup daemon is sleeping, commands derived from the command string are enqueued in a work queue for processing by the backup daemon. The backup daemon is then awakened such that the derived commands in the work queue are processed. In the event that the backup daemon is busy, commands derived from the command string are failed, thereby synchronizing the derived commands with the processing of the backup daemon.

12 Claims, 4 Drawing Sheets

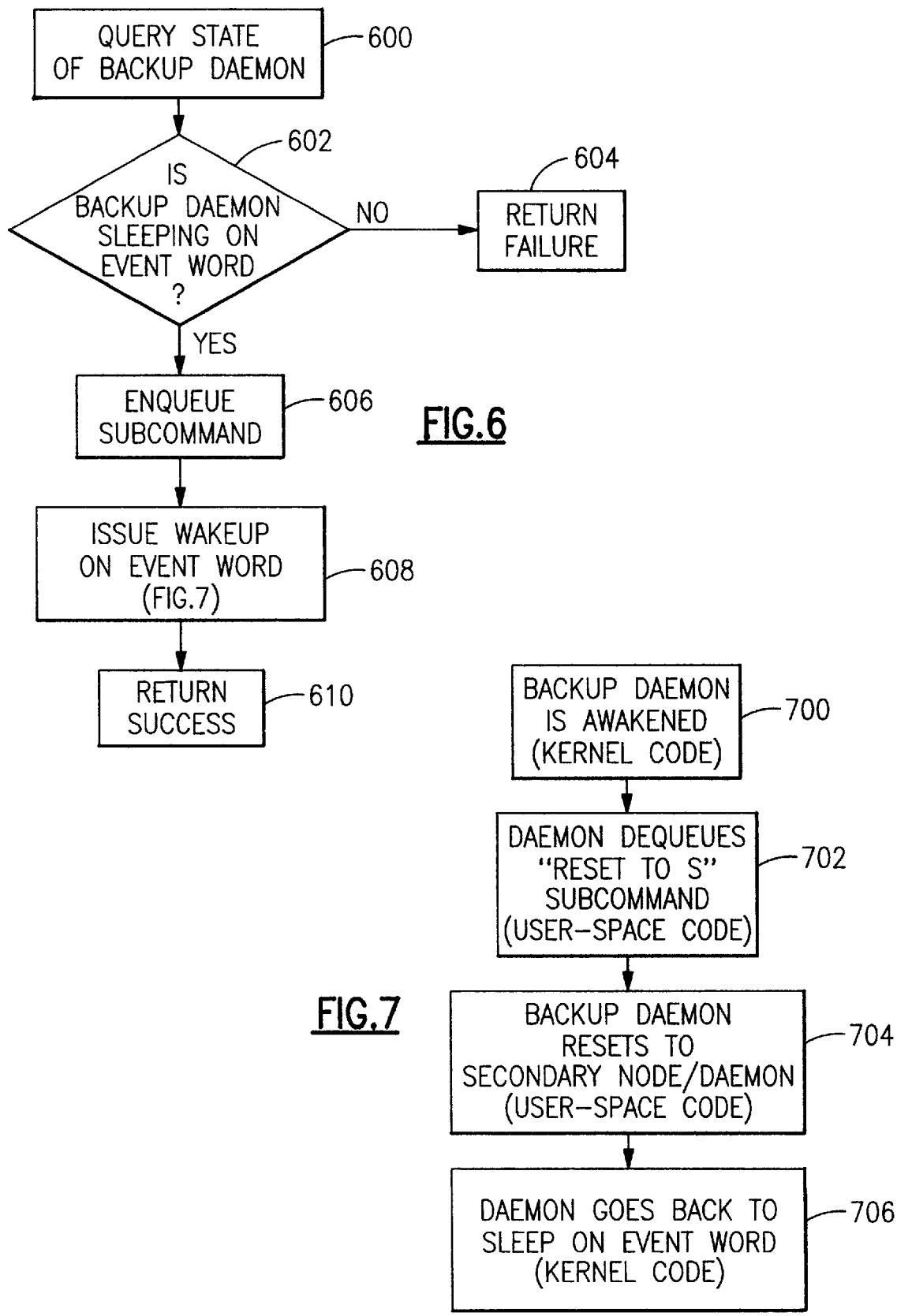

APPARATUS FOR SYNCHRONIZING OPERATOR INITIATED COMMANDS WITH A FAILOVER PROCESS IN A DISTRIBUTED PROCESSING SYSTEM

The present invention relates to performing failover in a distributed processing system, and more particularly relates to synchronizing operator initiated commands with a failover process in a distributed processing system.

BACKGROUND OF THE INVENTION

Distributed systems are known having a control workstation and a plurality of nodes, all joined by a switch. One of the nodes is designated as a primary node for initialization and recovery of the switch network. A backup node is provided to take over the responsibilities of the primary node in the event that the primary node fails in a process known as "failover". If an operator commands that the primary node designation be assigned to a new operator selected node at or about the same time as the primary node failure, the backup node may first take over the duties of the primary node, only for the operator command to immediately change the primary node to the operator selected node. The present invention provides for the synchronizing of operator initiated commands with the failover process for more efficient operation of the backup daemon.

A system is also known in which a command is enqueued on a work queue of a daemon if the daemon is asleep, and failed if the daemon is busy to prevent the daemon from repeating work it is in the process of performing.

U.S. Pat. No. 5,408,645 issued Apr. 18, 1995 to Ikeda et al. for CIRCUIT AND METHOD FOR DETECTING A FAILURE IN A MICROCOMPUTER discloses a circuit in which a watch-dog timer monitors an internal state of a microcomputer for detecting the failure of the microcomputer.

U.S. Pat. No. 5,463,763 issued Oct. 31, 1995 to Kubo for APPARATUS AND METHOD FOR SUPERVISING MULTIPROCESSOR COMMUNICATIONS USING MESSAGES TRANSMITTED BETWEEN PROCESSORS IN A CIRCULAR FASHION discloses a multiprocessor system including a plurality of processors and detecting the occurrence of a failure in a node according to whether or not a normal operation message indicating the node processor is operating normally is transmitted within a preset monitoring time.

U.S. Pat. No. 5,473,599 issued Dec. 5, 1995 to Li et al. for STANDBY ROUTER PROTOCOL discloses a system and protocol for routing data packets from a host on a LAN through a virtual address belonging to a group of routers. A standby router backs up an active router so that if the active router becomes inoperative, the standby router automatically takes over for the active router in emulating a virtual router.

U.S. Pat. No. 5,485,465 issued Jan. 16, 1996 to Liu et al. for REDUNDANCY CONTROL FOR A BROADCAST DATA TRANSMISSION SYSTEM discloses an apparatus for a broadcast communication network. The absence of a packet of information on the primary link within a predetermined period of time of receipt of a corresponding packet on a secondary link generates an error signal to change the count in a counter in a predetermined direction. When the count reaches a predetermined number the secondary is switched to become the primary link.

U.S. Pat. No. 5,544,077 issued Aug. 6, 1996 to Hershey for HIGH AVAILABILITY DATA PROCESSING SYSTEM AND METHOD USING FINITE STATE MACHINES discloses a high availability data processing system including a primary processor at a first node, and a first standby processor at a second node of the communications network. The second node has a first event driven interface therein coupled to the network for detecting an alarm signal. When a characteristic pattern is detected by the event driven interface, switch over logic in the first standby processor invokes primary status in the first standby processor.

IBM Technical Disclosure Bulletin, Vol. 27, No. 8, January 1985 by Goyal et al. for SUPERVISOR RECOVERY IN RING NETWORKS discloses the use of an I-AM-ALIVE message within a specified time period to detect if the primary supervisor has failed to begin an election process to select one of the other processors to undertake the supervisory role.

SUMMARY OF THE INVENTION

An apparatus is disclosed for synchronizing operator commands with a failover process in a distributed system having a control workstation and a plurality of nodes. One of the nodes of the distributed system is designated a primary node and one of the nodes is designated a backup node. The backup node includes a backup daemon for performing a failover process if the primary node fails such that the backup node becomes the primary node. Shell scripts send a command string to be synchronized with the operation of the backup daemon from the control workstation to the backup node. The backup daemon is then checked to determine if the backup daemon is sleeping, and, in the event the backup daemon is sleeping, commands derived from the command string are enqueued in a work queue for processing by the backup daemon. The backup daemon is then awakened such that the derived commands in the work queue are processed. In the event that the backup daemon is busy, commands derived from the command string are failed, thereby synchronizing the derived commands with the processing of the backup daemon.

It is therefor a primary object of the present invention to provide for synchronizing operator commands with a failover process in a distributed system.

It is another object of the present invention to provide for enqueueing subcommands from a control workstation into a work queue in a backup node to be processed by a backup daemon, if the backup daemon is asleep when the subcommand is received by the backup node.

It is another object of the present invention to provide for failing subcommands from a control workstation to a backup node if a backup daemon on the backup node is busy when the subcommands are received.

It is another object of the present invention to send a subcommand to a backup node which resets the backup node to a secondary node, and to send a subcommand to an operator selected node for the selected node to become the primary node if the backup node is successfully reset to a secondary node.

The foregoing and other objects, features and advantages of the invention will be apparent from the following more particular description of the preferred embodiment of the invention as illustrated in the drawings.

BRIEF DESCRIPTION OF THE DRAWINGS

FIG. 6 is a flowchart of a RESET-TO-S program in the kernel space of the present invention; and FIG. 7 is a flowchart of a wakeup process of the present invention.

DESCRIPTION OF THE PREFERRED EMBODIMENT

Figure 1:
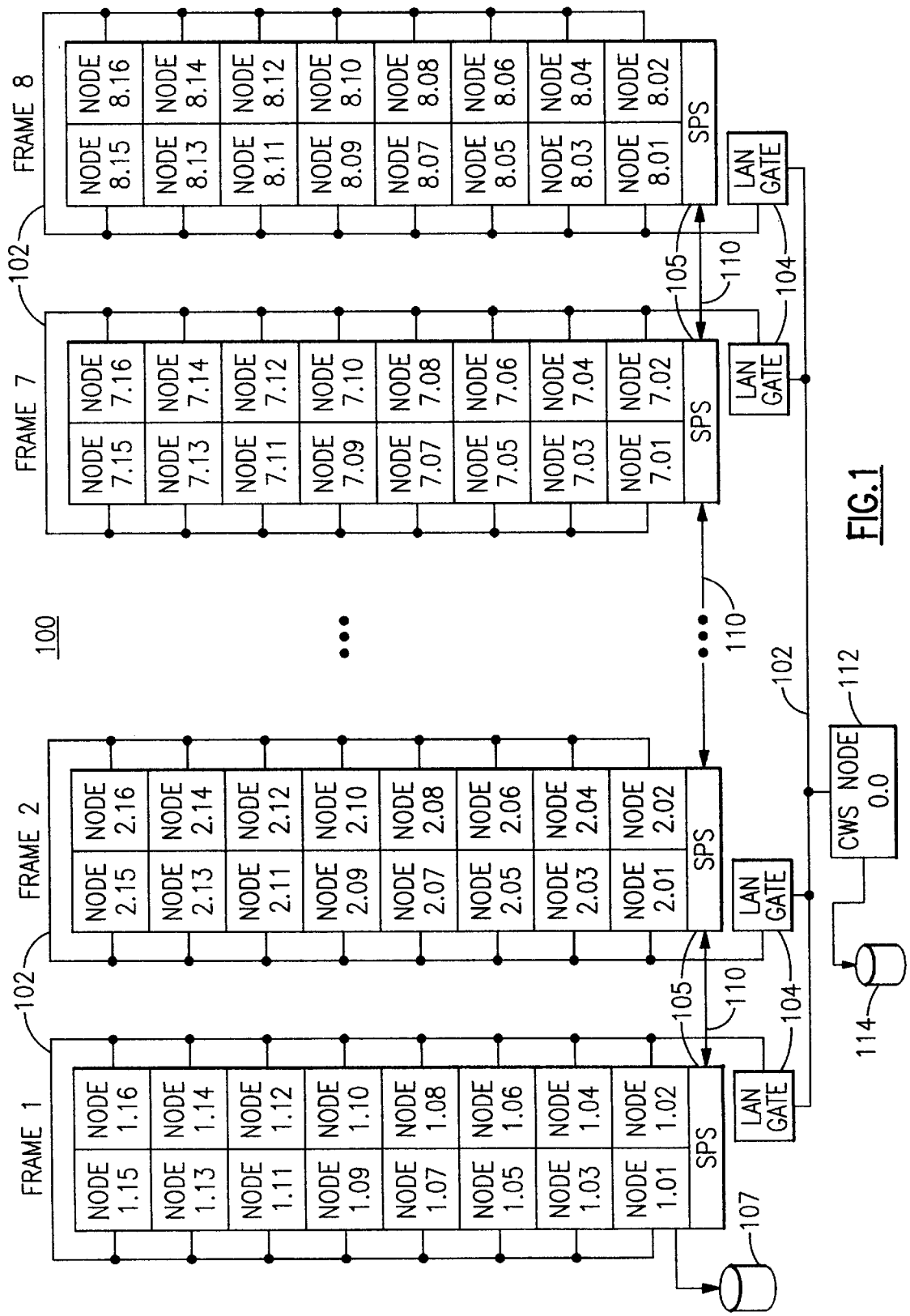
FIG. 1 is a schematic diagram of a distributed processing system usable with the present invention.

FIG. 1 is a schematic diagram of a distributed computer system 100 useable with the present invention. The distributed computer system 100 may be an IBM RISC System/6000 Scalable POWERparallel Systems (SP) distributed computer system available from International Business Machines Corporation of Armonk, N.Y. The embodiment disclosed in FIG. 1 is an SP computer having a total of 8 frames, with each frame having up to 16 nodes, for a total of 128 nodes. All of the nodes 106 are joined by a local area network (LAN) 102. Each node 106 is a computer itself, and may be a RISC System/6000 workstation, as is well known by those skilled in the art.

All of the nodes in a frame of the SP computer 100 are included in a LAN segment which is joined by the other LAN segments through LAN gates 104. Also connected to the LAN 102, is a control workstation (CWS) 112 which controls operation of the SP computer 100. The control workstation has a direct access storage device (DASD) 114 on which is stored the system data repository files (SDR). The SDR files include such information as a list of nodes that are in the system and their configuration. Each node 106 also includes a DASD device 107 for storing data processed by the SP computer 100.

In one embodiment, the nodes in each frame are also connected to an IBM Scalable POWERparallel switch (SPS) 105. Each of the SPS 105 of each frame is connected to neighboring SPS 105 of other frames by a bus 110.

As well understood in the art, the CWS node 112 sends system data and control signals to the frames of the SP computer 100 by means of the LAN 102 while messages and data may be sent from one to another of the nodes 106 by means of the high performance switches 105.

Figure 2:
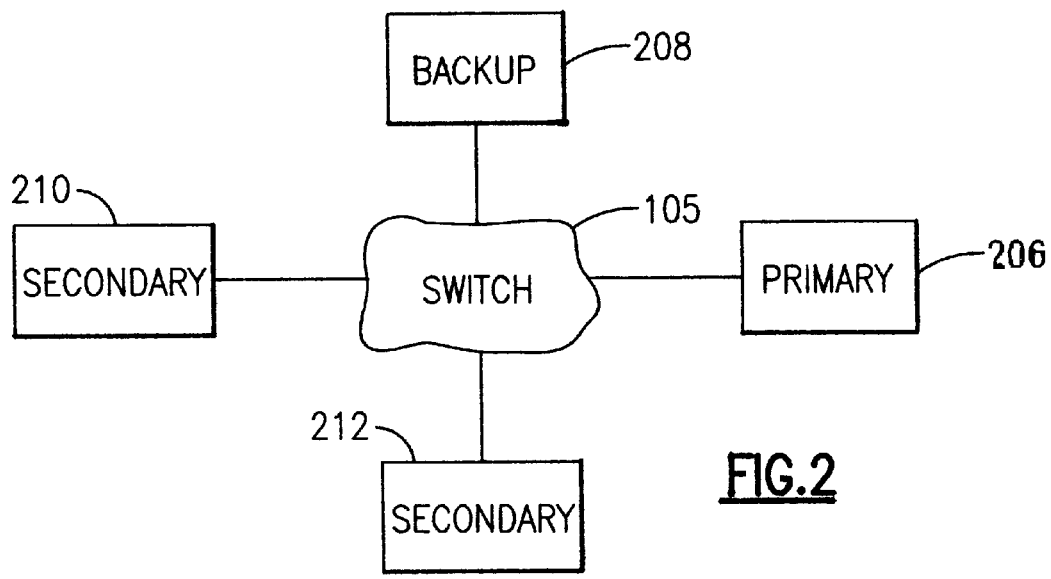
FIG. 2 is a block diagram showing a portion of the system of FIG. 1 and having a primary node, a backup node, and two secondary nodes connected by a switch.

FIG. 2 is a portion of the system of FIG. 1 including a primary node 206, a backup node 208, and two secondary nodes 210 and 212. The nodes 206–212 are connected to the SPS 105, as described in connection with FIG. 1. As is well known in the art, the primary node 206 is used for the initialization and recovery of the switch network. The primary node 206 monitors the state of the switch network, and when a switch fault is detected, the primary node repairs the damage. This may be done by changing route tables through the switch to avoid the switch fault, or in the case of a failed node, fencing the failed node. The primary node also responds to commands from the operator. The backup node 208 continuously monitors the primary node 206, and in the event the primary node 206 fails, takes over the responsibilities of the primary node and selects a new backup node, described herein as "failover". In a well known manner, the primary node 206 sends periodic heartbeat signals to the backup node 208 to report "I am alive".

As described, if the backup node 208 misses two consecutive heartbeats, it assumes that the primary node has failed, and starts the automatic failover process to transfer all of the responsibilities of the primary node 206 to the backup node 208, and to assign the responsibilities of the backup node 208 to a secondary node such as one of the nodes 210 or 212. In many cases, an operator may wish to manually change the responsibilities of the primary node and/or backup node to other nodes. If the failover process has already started on the backup daemon, and the operator issues commands to change the primary or backup nodes, the present invention synchronizes the commands such that the system does not try to place work on the work queue of the backup node 208 when the daemon is busy.

The sequence of events will now be discussed for when the operator, for instance, selects a new primary node. A new primary node is selected by the operator by issuing an "ESTART" command on the CWS 112. The operator initiated ESTART command causes a "RESET-TO-S" subcommand to be sent to the backup node to command the backup node to change to a secondary node without backup responsibilities. If the RESET-TO-S subcommand is successful, a "BECOME-P" command is sent to an operator selected node for that node to become the primary node. The newly selected primary node then assumes the responsibilities of the primary node. A new backup node may also be selected, if desired. It will be understood that this procedure will prevent any loss in protection by always having a primary node assigned throughout the entire process.

The failover process will now be discussed. When the backup node misses two consecutive heartbeat signals from the primary node, the backup node will take on the responsibilities of the primary node, and a new backup node will be selected. It will be noticed that the same work will be performed by the backup node in the course of a failover process, or in the event that the operator has selected the backup node to become a new primary. The present invention, thus is used to synchronize operator commands with the failover process such that work will not be started responsive to an operator command when the same work is being performed during a failover process. This will be better understood after FIG. 3 is discussed.

Figure 3:
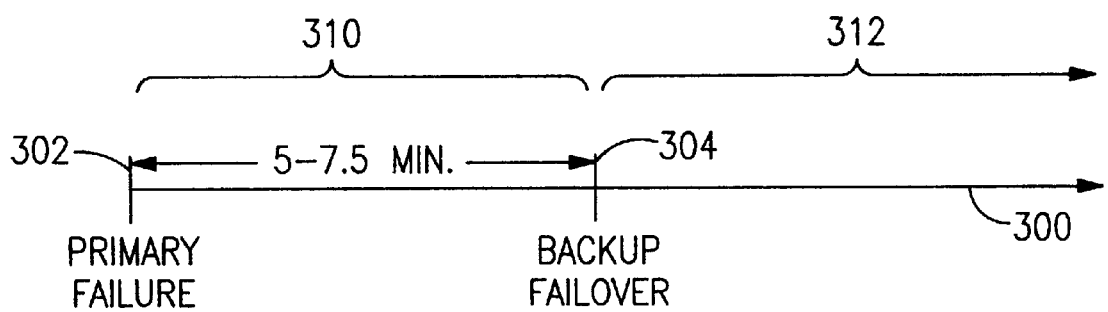
FIG. 3 is a time line illustrating the timing of a failover operation if the primary node of FIG. 2 fails.

FIG. 3 is a time line 300 which illustrates how the same work might be requested at the same time. At 302, a primary node failure has occurred. There is a period of time 310 after the failure of the primary node at 302 until the backup node 208 sees the failure and begins the failover process at 304. The time 310 might vary from about between 5 and 7.5 minutes. During the time period 310, the operator, either in response to the failure, or for some other administrative reason, might command that the primary node be changed to another node. As previously explained, the work performed by the backup node in response to an ESTART command is the same work that is performed by the failover process. Since the ESTART command from the operator does the same work as the failover process followed by the backup daemon, the present invention provides for checking to see if failover processing is already being performed before a new ESTART command from the operator is allowed to proceed, as will be explained.

It will further be understood that the present procedure will insure that even if the primary node should fail during the ESTART process, conflicting assignments will not be made. Consider the situation where, in response to an ESTART command from the operator, the backup node is reset to a secondary node, but before a BECOME-P subcommand can be sent to a new operator selected primary node, the old primary node fails. If the backup node had not first been set to secondary, the backup node would attempt to take over as the primary node, even as the operator was attempting to select a new primary node. In the present embodiment, a new primary node would first be assigned by the operator to take over for the now failed old primary node, and then the backup node (either the old or a new backup node, as specified by the operator) will be assigned or reassigned.

Figure 4:
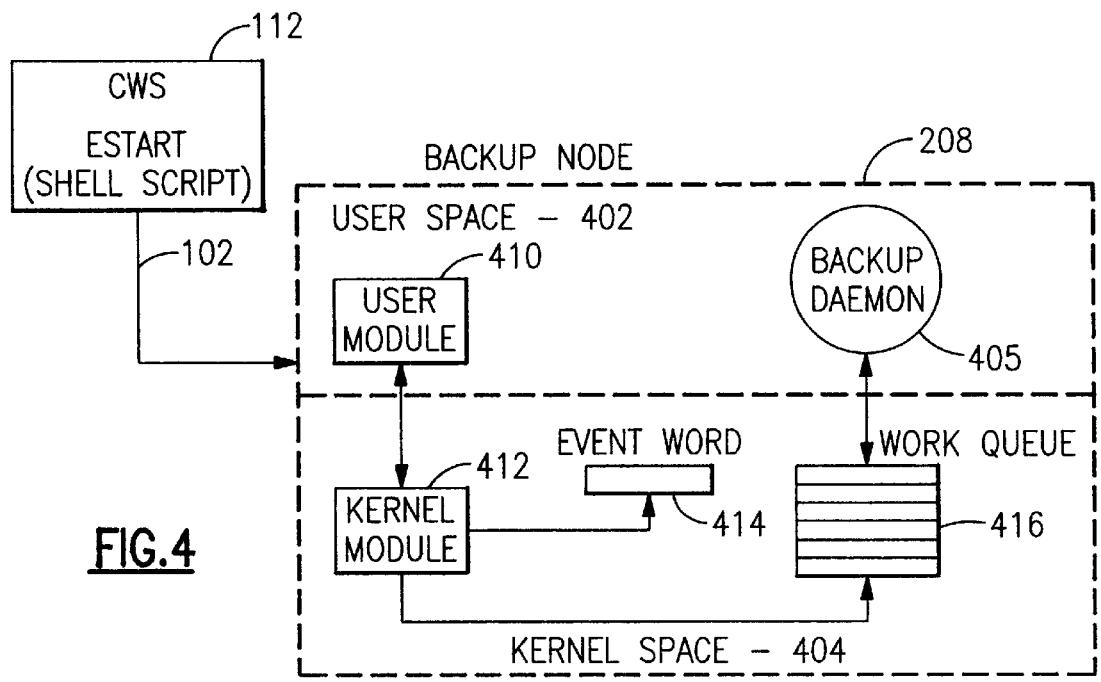
FIG. 4 is a block diagram of the present invention wherein a command string from a control workstation (CWS) of the system of FIG. 1 is synchronized with the operation of a failover daemon in the system portion of FIG. 2.

FIG. 4 is a block diagram of a portion of the system of FIG. 1 and shows the CWS 112 on which operator commands are issued, and a representation of the backup node 208. The operator issues an ESTART command on the CWS 112 in the form of shell scripts, some of which are sent over the lan 102 to the backup node. Shell scripts are well understood by those skilled in the art of the present invention, and will not be described further. As is well understood, the memory of the backup node from which programs are executed is divided into a user space 402 and a kernel space 404. A backup daemon 405 resides in the user space 402, and performs some of the work of the ESTART command from the operator, and also performs work to accomplish the failover process. A user module 410 also resides in the user space 402 which communicates with a kernel module 412 in the kernel space 404. An event word 414 is provided in the kernel space 404 which is interrogated by the kernel module 412 to determine if the backup daemon is sleeping or awake. If the backup daemon is awake and doing work, the contents of the event word is a null value. If the backup daemon is sleeping, the event word contains the process identification (PID) of the backup daemon. This scheme is known as post-and-wait, and is well understood in the art. The kernel space 404 also contains a work queue 416 in which work is enqueued for the backup daemon.

Figure 5:
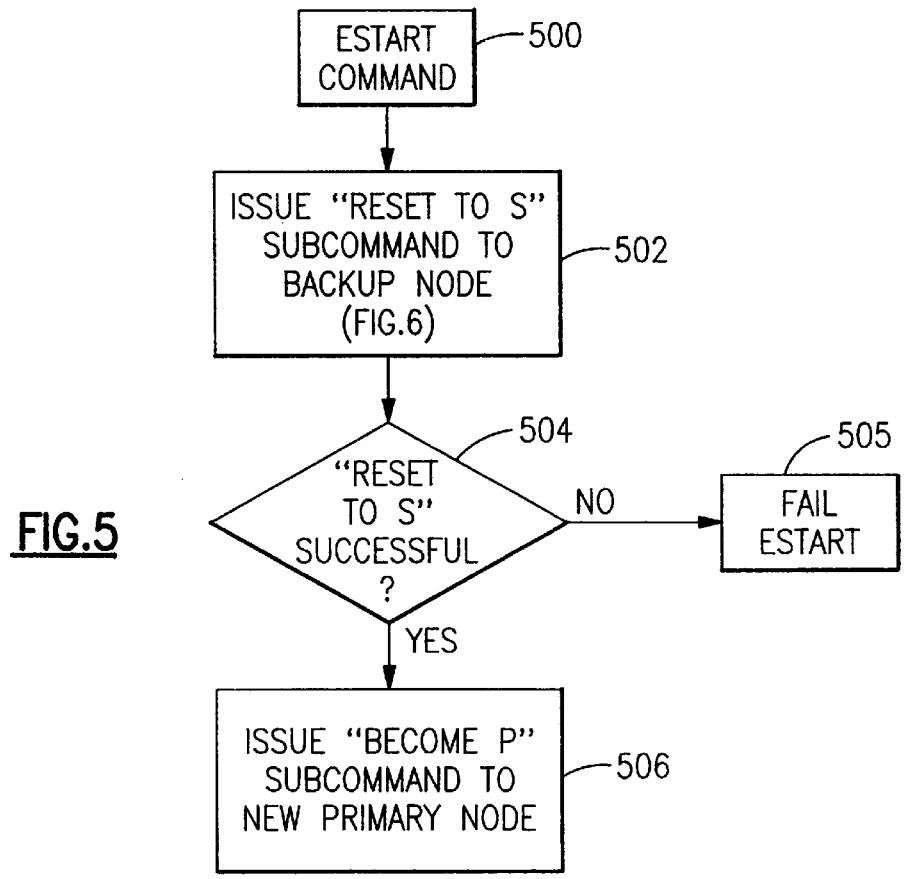
FIG. 5 is a flowchart of command strings on the CWS.

FIG. 5 is a flowchart of the ESTART command shell script 500 issued by the operator on the CWS 112 for the backup daemon in the backup node 208. At 502, a "RESET-TO-S" subcommand is issued to the backup node wherein the backup daemon of the backup node resets to a secondary node. The portion of the RESET-TO-S subcommand which is part of the present invention is explained in connection with FIG. 6. At 504 a check is made to see if the RESET-TO-S subcommand is successful. If it is not, the ESTART command fails at 505, and the operator is notified. If the RESET-TO-S subcommand is successful at 504, the "BECOME-P" subcommand is issued for any operator selected node to become the new primary node at 506.

FIG. 6 is a flowchart of that portion of the RESET-TO-S subcommand which is part of the present invention. It will be understood that the RESET-TO-S subcommand includes other code than that shown in FIG. 6. However, the other code is not part of the present invention, and will not be discussed further. FIG. 6 is that part of the RESET-TO-S subcommand which performs a query of the state of the backup daemon 600. It will be understood that as part of the RESET-TO-S subcommand, user space code will ask kernel space code to query that state of the backup daemon. At 602, a check is made by kernel code to see if the backup daemon is sleeping on the event word, as previously explained. If the backup daemon is not sleeping (that is, it is awake and already doing work, e.g. failover), a failure is returned at 604, and the subcommand is ended. If the backup daemon is sleeping at 602, the RESET-TO-S subcommand is enqueued on the work queue 416 at 606. At 608, a wakeup is issued on the event word, to be explained in connection with FIG. 7, and success is returned at 610. It will be understood that at 610, kernel code returns success to user space code, which will then return success to the shell script on the CWS 112. A similar process is followed in connection with the return of failure at 604.

FIG. 7 is a flowchart of the wakeup routine of 608. At 700, kernel code awakens the backup daemon based on the PID in the event word 414. The contents of the event word is changed to a null value to show that the backup daemon is awake. At 702, user space code dequeues the RESET-TO-S subcommand which was enqueued in the work queue 416 at 606 of FIG. 6. At 704, user space code of the backup daemon resets to secondary. At 706, the kernel code makes the backup daemon go back to sleep on the event word and places the PID of the backup daemon in the event word 414.

Even though the present invention is illustrated with the ESTART command and failover process, it will be understood that the present invention may be used to synchronize other commands to prevent work from being performed that has been started by other processes in similar circumstances.

While we have illustrated and described the preferred embodiment of our invention, it is to be understood that we do not limit ourselves to the precise construction herein disclosed, and the right is reserved to all changes and modifications coming within the scope of the invention as defined in the appended claims.

What is claimed is:

1. An apparatus for preventing duplicate work from being done while performing operator commands during a failover process in a distributed system having a control workstation and a plurality of nodes, one of said nodes being designated a primary node and one of said nodes being designated a backup node, said backup node having a backup daemon which may be either asleep or awake, the apparatus comprising:

means for sending a command string from the control work station to the backup node, said command string for performing the same work as said backup daemon;

means for checking said backup daemon in said backup node to determine if said backup daemon is either awake or sleeping;

means for inserting subcommands derived from said command string into a queue in the event said backup daemon is sleeping, wherein said subcommands are enqueued for processing by said backup daemon;

means for waking up said backup daemon in the event said backup daemon is asleep, such that said backup daemon will process said derived subcommands in said queue; and means for ending subcommands derived from said command string in the event said backup daemon is not sleeping, thereby preventing work from being done by said derived subcommands which would be duplicative of work done during the processing of said backup daemon.

2. The apparatus of claim 1 wherein said means for checking said backup daemon comprises means for checking the contents of an event word to determine if said event word contains either a null value indicating said backup daemon is busy, or a process identification value indicating said backup daemon is sleeping.

3. The apparatus of claim 2 wherein means for ending subcommands comprises means for returning a failure indication to the control workstation, thereby indicating said backup daemon is busy.

4. An apparatus for preventing duplicate work from being done while performing operator commands during a failover process in a distributed system having a control workstation and a plurality of nodes, one of said nodes being designated a primary node and one of said nodes being designated a backup node, said backup node having a backup daemon which may be either asleep or awake, the apparatus comprising:

means for sending a command string from the control work station to the backup node, said command string for performing the same work as said backup daemon;

means for checking said backup daemon in said backup node to determine if said backup daemon is either awake or sleeping;

means for inserting subcommands derived from said command string into a queue in the event said backup daemon is sleeping, wherein said subcommands are enqueued for processing by said backup daemon;

means for waking up said backup daemon in the event said backup daemon is asleep, such that said backup daemon will process said derived subcommands in said queue; and means for ending subcommands derived from said command string in the event said backup daemon is not sleeping, thereby preventing work from being done by said derived subcommands which would be duplicative of work done during the processing of said backup daemon;

wherein said means for checking said backup daemon comprises means for checking the contents of an event word to determine if said event word contains either a null value indicating said backup daemon is busy, or a process identification value indicating said backup daemon is sleeping;

wherein said means for waking up said backup daemon comprises placing a null value in said event word indicating said backup daemon is busy.

5. The apparatus of claim 4 wherein said means for inserting subcommands into said queue comprises means for enqueueing a RESET-TO-SECONDARY subcommand into said queue.

6. The apparatus of claim 5 further comprising:

means for returning a success indication to said workstation subsequent to waking up said backup daemon, and means for issuing from said workstation to a specified node, a BECOME-PRIMARY subcommand responsive to said success indication.

7. An apparatus comprising:

a control workstation;

a plurality of nodes, one of said nodes being designated a primary node and one of said nodes being designated a backup node, said backup node having a user space for storing user programs and a kernel space for storing kernel programs;

a backup daemon in the user space of said backup node;

shell scripts in said control workstation sending a command string from said control workstation to said backup node, said command string to be synchronized with the operation of said backup daemon;

a user module in the user space of said backup node and communicating with said shell scripts;

a kernel module in said kernel space communicating with said user module;

a daemon checking routine in said kernel module checking said backup daemon in said backup node to determine if said backup daemon is sleeping;

a work queue in said kernel space for storing work for said backup daemon;

a command inserting routine in said kernel module, said command inserting routine inserting subcommands derived from said command string into said work queue in the event said backup daemon is sleeping, wherein said commands are enqueued for processing by said backup daemon;

a wake up routine in said kernel module waking up said backup daemon in the event said backup daemon is asleep such that said backup daemon will process said derived subcommands in said queue; and a fail routine in said kernel module ending subcommands derived from said command string in the event said backup daemon is not sleeping, thereby synchronizing said derived subcommands with the processing of said backup daemon.

8. The apparatus of claim 7 further comprising:

an event word in said kernel space containing a value indicative if said backup daemon is sleeping, said daemon checking routine checking the contents of an event word to determine if said event word contains either a null value indicating said backup daemon is busy, or a process identification value indicating said backup daemon is sleeping.

9. The apparatus of claim 8 further comprising:

a failure indication routine in said fail routine, said failure indication routine returning a failure indication to said user module for forwarding to the control workstation, thereby indicating said backup daemon is busy.

10. An apparatus comprising:

a control workstation;

a plurality of nodes, one of said nodes being designated a primary node and one of said nodes being designated a backup node, said backup node having a user space for storing user programs and a kernel space for storing kernel programs;

a backup daemon in the user space of said backup node;

shell scripts in said control workstation sending a command string from said control workstation to said backup node, said command string to be synchronized with the operation of said backup daemon;

a user module in the user space of said backup node and communicating with said shell scripts;

a kernel module in said kernel space communicating with said user module;

a daemon checking routine in said kernel module checking said backup daemon in said backup node to determine if said backup daemon is sleeping;

a work queue in said kernel space for storing work for said backup daemon;

a command inserting routine in said kernel module, said command inserting routine inserting subcommands derived from said command string into said work queue in the event said backup daemon is sleeping, wherein said commands are enqueued for processing by said backup daemon;

a wake up routine in said kernel module waking up said backup daemon in the event said backup daemon is asleep such that said backup daemon will process said derived subcommands in said queue; and a fail routine in said kernel module ending subcommands derived from said command string in the event said backup daemon is not sleeping, thereby synchronizing said derived subcommands with the processing of said backup daemon an event word in said kernel space containing a value indicative if said backup daemon is sleeping, said daemon checking routine checking the contents of an event word to determine if said event word contains either a null value indicating said backup daemon is busy, or a process identification value indicating said backup daemon is sleeping wherein said wake up routine places a null value in said event word indicating said backup daemon is busy.

11. The apparatus of claim 10 wherein said command inserting routine enqueues a RESET-TO-SECONDARY subcommand into said queue.

12. The apparatus of claim 11 further comprising:

a success returning routine in said kernel module, said success returning routine returning a success indication to said user module for forwarding to said control workstation subsequent to waking up said backup daemon, and said shell scripts including scripts for issuing from said control workstation to a specified node, a BECOME-PRIMARY subcommand responsive to said success indication.

* * * * *